United States Patent [19]
Pattison et al.

[11] Patent Number: 5,991,373
[45] Date of Patent: *Nov. 23, 1999

[54] REPRODUCTION OF A VOICE AND VIDEO SESSION

[75] Inventors: Jon A. Pattison, Flower Mound; John A. Fox, Irving, both of Tex.; David Machalica, Bunch, Okla.

[73] Assignee: Teknekron Infoswitch Corporation, Fort Worth, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/929,490

[22] Filed: Sep. 15, 1997

[51] Int. Cl.⁶ .................................................. H04M 11/00
[52] U.S. Cl. ................................... 379/93.17; 379/93.14; 379/265; 379/93.21; 379/93.25; 348/15
[58] Field of Search .............................. 379/93.17, 93.21, 379/93.23, 93.24, 93.25, 100.08, 100.09, 100.11, 265, 266, 309, 93.14; 395/557, 200.33, 200.38; 348/6.7, 15

[56] References Cited

U.S. PATENT DOCUMENTS

| | | | |
|---|---|---|---|
| 5,119,474 | 6/1992 | Beitel et al. | 395/154 |
| 5,351,276 | 9/1994 | Doll, Jr. et al. | 379/67 |
| 5,442,390 | 8/1995 | Hooper et al. | 348/7 |
| 5,535,256 | 7/1996 | Maloney et al. | 379/34 |
| 5,621,789 | 4/1997 | McCalmont et al. | 379/265 |
| 5,704,030 | 12/1997 | Kanzaki | 395/557 |
| 5,737,531 | 4/1998 | Ehley | 395/200.38 |
| 5,748,499 | 5/1998 | Tryeblood | 395/200.33 |

FOREIGN PATENT DOCUMENTS

WO94/01964  1/1994  WIPO .............................. H04N 1/00

OTHER PUBLICATIONS

European Search Report; all, Jan. 19, 1999.
Kimiaki Shoji; "Development of Video Communications Products for an Expanding Range of Uses"; NTT Review; all, Nov. 1995.
Louise Lamont, et al; "Synchronization of Multimedia Data for a Multimedia News–on–Demand Application"; IEEE Journal on Selected Areas in Communications; all, Jan. 1, 1996.

*Primary Examiner*—Stella Woo
*Attorney, Agent, or Firm*—Baker & Botts, L.L.P.

[57] ABSTRACT

A communication system for reproducing a voice and video session includes a call center having a voice server and a video server. The call center also includes agent and supervisor workstations with computers and associated voice instruments. The voice server records and communicates voice segments associated with the session using a voice path. The computers at the agent and supervisor workstations retrieve the video segment captured and stored by the video server, and display the video segment adjusted in time to reproduce the session.

30 Claims, 5 Drawing Sheets

| 150 | 152 | 154 | 156 |
|---|---|---|---|
| CLIENT ID | ADDRESS | OFFSET | LAST UPDATE |
| JOE | 10.40.254.104 | 25 | 1/1/97 10:00:00 |
| JANE | jane@server | −37 | 1/3/97 24:00:00 |
| ADMIN | admin.bigcorp | 182 | 1/2/97 08:00:00 |
| STATION 1 | 1004397 | −92 | 1/31/97 07:54:23 |
| ⋮ | ⋮ | ⋮ | |

*FIG. 3*

| 170 | 172 | 174 | 176 | 178 |
|---|---|---|---|---|
| SESSION ID | TYPE | OFFSET | LENGTH | PATH |
| 5 | VOICE | 50 | 123 | f:\voice\5010197.dat |
| 5 | VIDEO | 100 | 145 | video5@server |
| 5 | VOICE ANNOTATION | 100 | 156 | http:\\voiceann5.cti |
| 5 | VIDEO ANNOTATION | 25 | 22 | video.bigco.1324 |
| 3 | VIDEO | 300 | 92 | c:\video\3.dat |
| 3 | VOICE | 325 | 87 | c:\voice\3.dat |
| ⋮ | ⋮ | ⋮ | ⋮ | ⋮ |

*FIG. 4*

REPRODUCTION OF A VOICE AND VIDEO SESSION

TECHNICAL FIELD OF THE INVENTION

This invention relates generally to communication systems, and more particularly to the reproduction of a voice and video session.

BACKGROUND OF THE INVENTION

Call centers provide a wide array of services through sessions that include both a voice segment and a video segment. In a particular session, a call center service representative engages in voice communication with a customer to produce a voice segment, and may also generate, retrieve, or manipulate information on a computer display to produce an associated video segment. The combination of the voice segment and associated video segment together provide a record of the session.

Some existing systems include components that can record both the voice and video segments of a session. For example, components may record, digitize, and store a voice file that captures voice communication between the customer and the call center representative. Similarly, components can capture information displayed on the call center service representative's computer display or output.

Efforts to faithfully reproduce a voice and video session may be hampered if the voice segment and video segment are stored in different components of the call center accessible over different communication paths. For example, the propagation delay to communicate a voice segment using a voice path may be different from the propagation delay to communicate a video segment using a local area network. Moreover, different components in a call center may not maintain a synchronized clock, which further exacerbates efforts to faithfully reproduce the session.

SUMMARY OF THE INVENTION

In accordance with the present invention, a system and method for reproducing a session having a voice segment and a video segment are provided that substantially eliminate or reduce disadvantages or problems associated with previously developed communication systems and methods.

In one embodiment of the present invention, a system for reproducing a session having a voice segment and a video segment includes a voice server that stores the voice segment associated with the session. A video server stores the video segment associated with the session, and the video segment includes a number of video intervals with each video interval comprising video data and an associated interval offset. A client has a display and an associated voice instrument. The associated voice instrument communicates the voice segment. The display displays the video data for each video interval adjusted in time by the associated interval offset to reproduce the session.

In another embodiment of the present invention, a method for reproducing a session having a voice segment and a video segment includes storing the voice segment associated with the session. The video segment associated with the session is stored as a number of video intervals with each video interval comprising video data and an associated video offset. The voice segment is communicated to a voice instrument. The video data for each video interval is displayed on a display and adjusted in time by the associated interval offset to reproduce the session.

In yet another embodiment of the present invention, a method for reproducing a voice and video session at a client includes receiving a selection of the session that identifies a voice segment and a video segment. A voice path is terminated at a voice instrument associated with the client. A video segment associated with the session is received at the client, and the video segment includes a number of video intervals with each video interval comprising video data and an associated interval offset. The voice segment is received at the voice instrument using the voice path. The video data for each video interval is displayed on a display at the client and adjusted in time by the associated interval offset to reproduce the session.

Technical advantages of the present invention include an arrangement of a voice server, video server, and clients (e.g., agent workstation, supervisor workstation) that allows recording and reproduction of voice and video sessions. The system communicates the video segment and associated system commands using a local area network (LAN), and the voice segment using voice paths established by an automatic call distributor (ACD), private branch exchange (PBX), or other telecommunications switch of the call center.

Other technical advantages of the present invention include storage of the video segment as a series of time intervals to allow faithful reproduction of the session during playback. In a particular example, a client receives a voice segment using a designated voice path and contemporaneously displays the video segment adjusted in time to reproduce the session. The client adjusts the video display timing using interval offsets associated with each video interval. Moreover, the client may perform further adjustments using a client offset that indicates a difference between a first clock at the voice server that plays the voice segment and a second clock at the client that displays the video segment. Other technical advantages are readily apparent from one skilled in the art from the following figures, descriptions, and claims.

BRIEF DESCRIPTION OF THE DRAWINGS

For a more complete understanding of the present invention, and for further features and advantages thereof, reference is now made to the following description taken in conjunction with the accompanying drawings, in which:

FIG. 3 illustrates an offset table used in the communication system;

FIG. 4 illustrates a segment table used in the communication system;

DETAILED DESCRIPTION OF THE INVENTION

Figure 1:
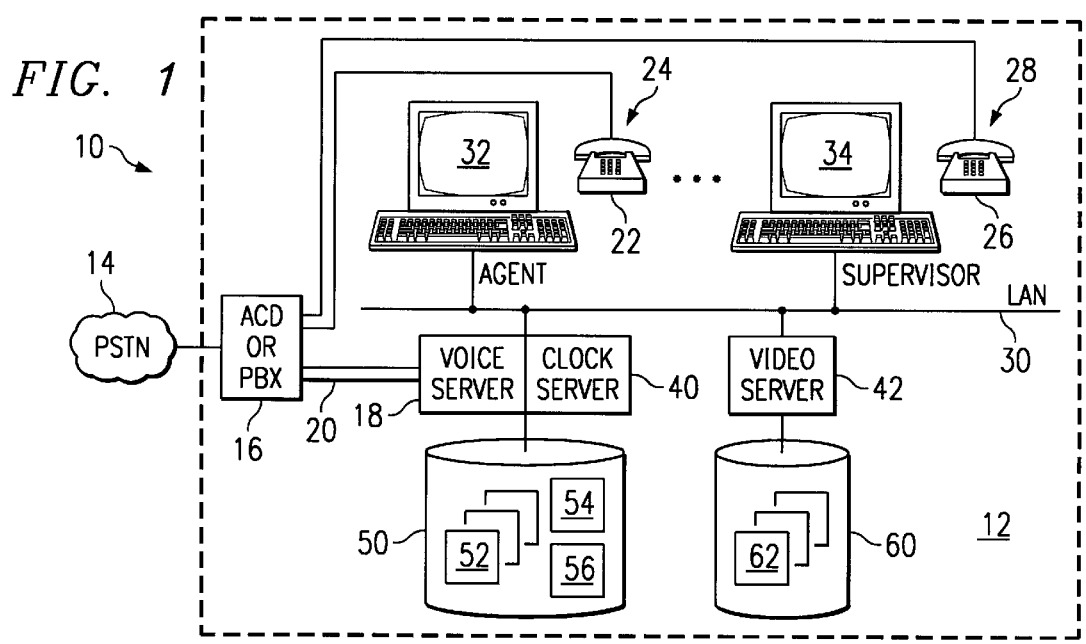
FIG. 1 illustrates a communication system for reproducing a session having a voice segment and a video segment in accordance with the present invention.

FIG. 1 illustrates a communication system 10 that includes a call center 12 coupled to the public switched telephone network (PSTN) or other switched or dedicated communication facility that can establish sessions with call center 12, which is referred to generally as PSTN 14. In general, call center 12 provides a wide array of services through sessions that include both a voice segment and a video segment. The components of call center 12 provide various functions and features that allow recording and faithful reproduction of the sessions.

Call center 12 includes an automatic call distributor (ACD), a private branch exchange (PBX), or other telecommunications switch 16 coupled to a voice server 18 using lines 20. Switch 16 is also coupled to a voice instrument 22 at agent workstation 24 and a voice instrument 26 at supervisor workstation 28. Voice instruments 22 and 26 terminate voice paths established from voice server 18 via switch 16.

A local area network (LAN) 30 couples the voice server 18 to a computer 32 at agent workstation 24 and a computer 34 at supervisor workstation 28. Computers 32 and 34 may be referred to generally as computers 32, and may include a real-time clock, a processor, volatile and non-volatile memory (RAM, ROM, CD-ROM, optical disk, etc.), a display, a mouse, a keyboard and other suitable input/output devices. Workstations 24 and 28 and/or computers 32 and 34 may be referred to generally as clients.

LAN 30 is also coupled to a clock server 40 and a video server 42. Generally, LAN 30 may represent a local area network, wide area network, or other communication network that supports communication of data between voice server 18, clock server 40, video server 42, and computers 32 and 34. Clock server 40 may comprise a software routine and/or hardware component that is integral to or separate from voice server 18. Voice server 18 refers to voice server 18 alone or in combination with clock server 40.

Voice server 18 maintains a database 50 that stores voice segments 52, offset table 54, and segment table 56, which are described below in greater detail with reference to FIGS. 2–4. Video server 42 maintains a database 60 that stores video segments 62, as described below in more detail with reference to FIG. 2.

Although communication system 10 illustrates one agent workstation 24 and one supervisor workstation 28, it is understood that call center 12 may include numerous agent workstations 24 and supervisor workstations 28. Moreover, call center 12 may include one or more switches 16, voice servers 18, clock servers 40, and video servers 42 depending on the particular design, capacity, and implementation details of communication system 10. Databases 50 and 60 may be implemented in one or more separate databases accessed locally or remotely by voice server 18 and video server 42.

In operation, switch 16 initiates a session at call center 12 in response to receiving a call from PSTN 14. Switch 16 transfers the call to voice instrument 22 of agent workstation 24. Depending on the satisfaction of a variety of scheduling criteria, switch 16 may establish a connection using lines 20 so that voice server 18 may record a voice segment 52 associated with the session. U.S. Pat. No. 5,535,256 entitled "Method and System for Automatically Monitoring the Performance Quality of Call Service Representatives" discloses various techniques for scheduling and recording voice segments, and is hereby incorporated by reference for all purposes.

During the session, computer 32 at agent workstation 24 generates information regarding the session, either automatically or as a result of user activity. Video server 42 communicating over LAN 30 captures screen shots, screen display and/or draw commands, or other information visually or audibly conveyed by computer 32 and stores this information as video segment 62 in database 60. As voice server 18 and video server 42 store voice segments 52 and video segment 62, respectively, system 10 updates segment table 56 with information on sessions and their associated voice and video segments.

Clock server 40 periodically performs a synchronization operation that determines clock offsets for components in call center 12. In a particular embodiment, clock server 40 identifies a client (e.g., computers 32 and 34) and sends a request to the client for its current clock setting. Upon receipt of a response from the client, clock server 40 determines the offset between the clock at the client and the clock at voice server 18, and records this offset in offset table 54. At predetermined intervals, upon request, or before a playback operation, clock server 40 updates the clock offsets maintained in offset table 54.

Call center 12 also allows playback or reproduction of a session previously handled and recorded by call center 12. To perform this operation, a supervisor operating computer 34 at supervisor workstation 28 selects a session to reproduce or monitor. Computer 34 then requests one or more associated video segments 62 stored in database 60 maintained by video server 42. Also, computer 34 requests establishment of a voice path from voice server 18 to voice instrument 26 via switch 16 that allows voice server 18 to play one or more voice segments 52 associated with the chosen session. At the appropriate queue, and optionally using clock offsets stored in offset table 54, computer 34 and voice instrument 26 concurrently communicate video segments 62 and voice segments 52, respectively, to reproduce the chosen session.

Figure 2:
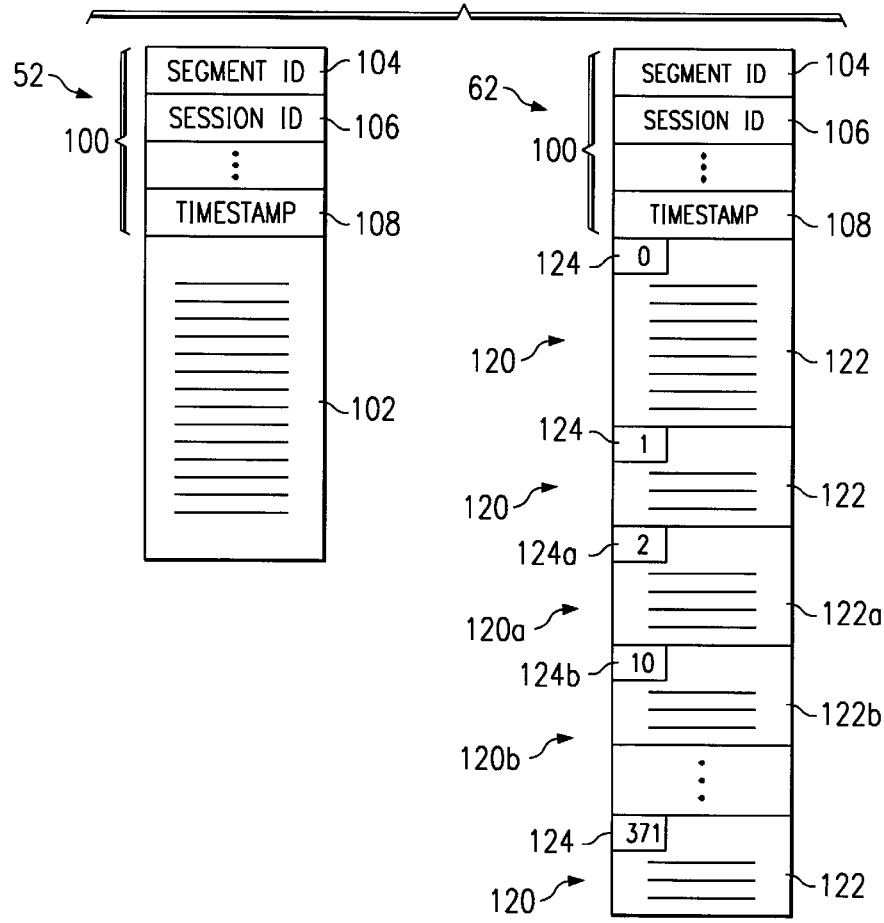
FIG. 2 illustrates exemplary data structures for the voice segment and video segment used in the communication system.

FIG. 2 illustrates exemplary data structures for voice segment 52 and video segment 62 used in communication system 10. Voice segment 52 includes a header 100 and voice data 102. Header 100 contains a segment identifier 104, a session identifier 106, and a timestamp 108. Header 100 may also include other information associated with voice segment 52, such as length and size information, compression information, error correction and recovery information, framing information, and any other information suitable to maintain and access voice segment 52 in database 50. Components of header 100 may be before, after, or interspersed with voice data 102. In a particular embodiment, voice data 102 comprises a contiguous segment of digitized voice information suitable for storage and subsequent playback. U.S. Pat. No. 5,535,256 describes particular systems and techniques for recording, storing, playing back, and modifying voice segments 52.

Video segment 62 also contains header 100 with similar information as voice segment 52. Video segment 62 comprises a number of video intervals 120 before, after, or interspersed with header 100. Each video interval 120 includes video data 122 and an associated interval offset 124. Video data 122 may comprise bit-mapped information, screen display and/or draw commands, or other form of information that represents text, graphics, mouse movements, or other information displayed on or output by computers 32 and 34. In a particular embodiment, video data 122 for the first video interval 120 of video segment 62 may comprise a complete image or screen dump, whereas subsequent video intervals 120 include video data 122 that represents changes to the displayed information. Sometimes the display at agent workstation 24 may flicker if computer 32 initially captures and stores video information as a collection of draw commands in the first video interval 120.

This is due to a redraw of the current screen initiated by computer 32 to capture the draw commands. This user-apparent flicker may be disadvantageous if a supervisor desires to monitor a session without the agent's knowledge. In these cases, computer 32 may retrieve a bit-mapped image stored in display memory without issuing a redraw command that causes this flicker.

Each interval offset 124 represents an amount of time from timestamp 108 at which video activity reflected by the associated video data 122 occurs. In a particular embodiment, each video interval 120 represents video activity for a fixed interval of time beginning at the time specified by interval offset 124. For example, each video interval 120 may begin at an 0.1 second increment specified by interval offset 124, and last for 0.1 seconds until the next video interval 120. The specific interval of time represented by each video interval 120 may be chosen and adjusted depending on the desired fidelity of reproduction, storage requirements and processing capabilities of components in communication system 10, user perception, or other factors.

The segmentation of video activity into video intervals 120 allows video server 42 to store and playback those video intervals 120 in which video activity actually occurs. The exemplary video segment 62 illustrated in FIG. 2 stores and indexes video intervals 120 for each one hundred millisecond (0.1 second) interval of time. Interval offset 124 represents the number of one hundred millisecond intervals from timestamp 108. A first video interval 120a having a video interval offset 124a of "2" (2×100 ms=0.2 seconds) is adjacent to a second video interval 120b having a video interval offset 124b of "10" (10×100 ms=1.0 seconds). In this example, since no video activity occurred between video interval 120a and video interval 120b—that is, between 0.3 and 1.0 seconds—video segment 62 need not store intervening video intervals. This allows video server 42 to compress video segment 62 by only storing those video intervals 120 in which video activity occurs. During reproduction of a session that includes video segment 62, computers 32 display video data 122 stored in video intervals 120 in accordance with the timing dictated by timestamp 108 and interval offsets 124.

FIG. 3 illustrates offset table 54 used in communication system 10. Each entry in offset table 54 includes a client identifier (ID) 150 associated with agent workstations 24 and supervisor workstations 28 in call center 12. For example, client ID 150 may comprise a login name, member identifier, station name, or other information that identifies computers 32. Offset table 54 also includes an address 152 for each client ID 150. This address may comprise a uniform resource locator (URL) address, a file transfer protocol (FTP) address, a network node or network name, or other identifier used by LAN 30 to communicate with computers 32.

Offset table 54 also includes an offset 154 that identifies the difference between a first clock at the voice server 18 and a second clock at computer 32 associated with client ID 150. Offsets 154 may be expressed as multiples of one hundred milliseconds, or using some other suitable expression that conveys absolute time or time differential. Offsets 154 may be positive or negative depending upon whether the second clock at computer 32 is ahead of or behind the first clock maintained at voice server 18 or clock server 40. Each entry in offset table 54 also includes a last update field 156 that indicates that last update time for offset 154.

Offsets 154 are an important aspect of communication system 10 because voice server 18 may direct playback of voice segment 52 using a first clock, and computers 32 may direct playback of video segment 52 using a second clock. As long as the first and second clocks are synchronized, communication system 10 can faithfully reproduce the session. The degree of synchronization depends on user perception, computational loads and/or traffic conditions of components in communication system 10, and other factors.

FIG. 4 illustrates segment table 56 used in communication system 10. Each entry in segment table 56 corresponds to a session identifier (ID) 170. Each entry may correspond to voice segment 52, video segment 62, voice annotation segment, or video annotation segment as indicated by type 172. Each segment also includes a corresponding offset 174 (expressed in multiples of one hundred milliseconds or other appropriate expression) from the beginning of the corresponding session and a length 176 of the segment. Offset 174 allows communication system 10 to reproduce different segments at the appropriate time to convey the session. Also, each entry in segment table 56 includes a path 178 that identifies the storage location from which components of communication system 10 can retrieve the identified segment. For example, path 178 may specify locations in databases 50 and 60, URL addresses, file transfer protocol (FTP) addresses, addresses supported by LAN 30 or PSTN 14, file pathnames, or other addressing or location information to identify and retrieve segments in communication system 10. Path 178 may reflect naming conventions that identify the session, time, server, or other information regarding stored segments.

Figure 5:
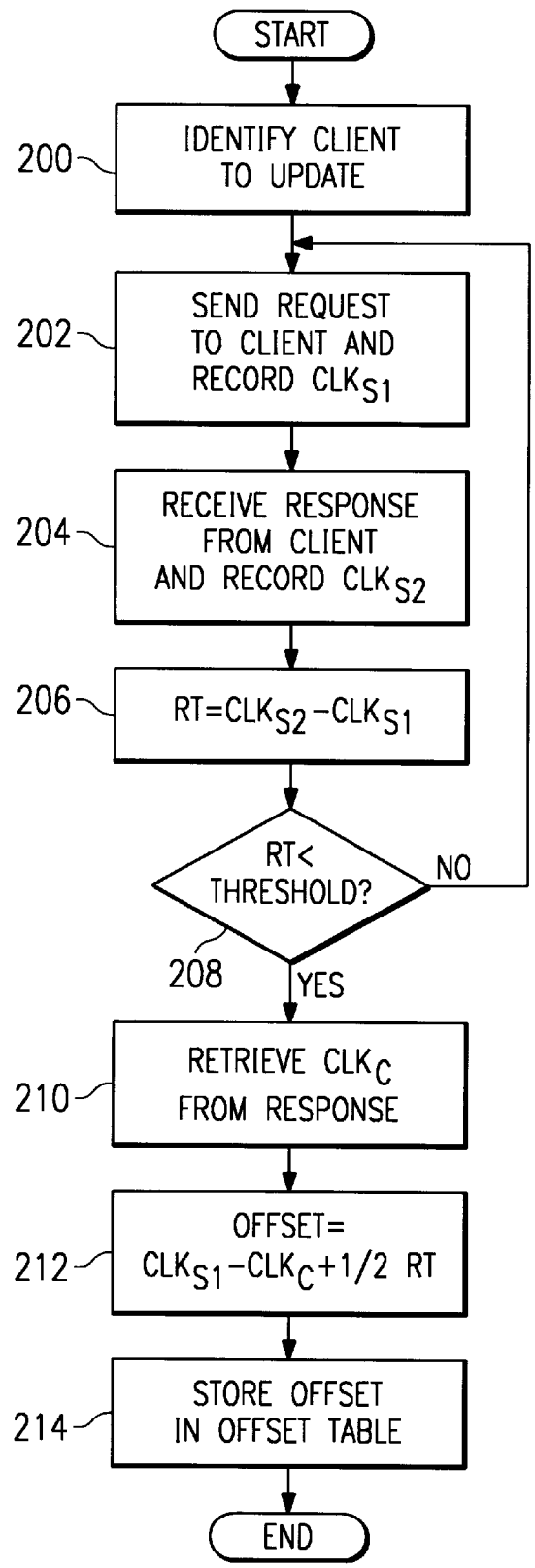
FIG. 5 is a flow chart of an exemplary method for determining a client offset in the communication system.

FIG. 5 is a flow chart of a method for determining offsets 154 in communication system 10. The method is described with reference to clock server 40, but other components in communication system 10, such as voice server 18, may perform all or part of this process with or without clock server 40. The method begins at step 200 where clock server 40 identifies a client to update. The client may be computers 32 and 34, or any other component in communication system 10 that maintains an independent clock. Clock server 40 then sends a request to the identified client and simultaneously records a first server clock reading ($CLK_{S1}$) at step 202. Clock server 40 then receives the response from the client and simultaneously records a second server clock reading ($CLK_{S2}$) at step 204. Clock server 40 then computes the round-trip time (RT) as the difference between $CLK_{S2}$ and $CLK_{S1}$ at step 206. RT represents the propagation time between clock server 40 and the client and back to clock server 40, together with any delay at the client in receiving the request, processing, and communicating the response.

If RT is not less than a predetermined threshold at step 208, then steps 202–206 are repeated to receive another response from the client. This is done to ensure that the computational load and/or traffic considerations in communication system 10 does not degrade or corrupt the response from the client. In a particular embodiment, the threshold may be set at one hundred milliseconds or some other expected response time when communication system 10 is not overloaded.

If RT is less than the predetermined threshold at step 208, then clock server 40 retrieves a client clock reading ($CLK_C$) provided in the response from the client at step 210. Clock server 40 then calculates offset 154 using the following equation:

$$Offset = CLK_{S1} - CLK_C + \tfrac{1}{2}RT.$$

Offset 154 may or may not include the term ½ RT, depending upon system characteristics and the desired accuracy of offset 154. Clock server 40 then stores offset 154 along with client ID 150, address 152, and last update 156 in offset table 54 at step 214.

Figure 6:
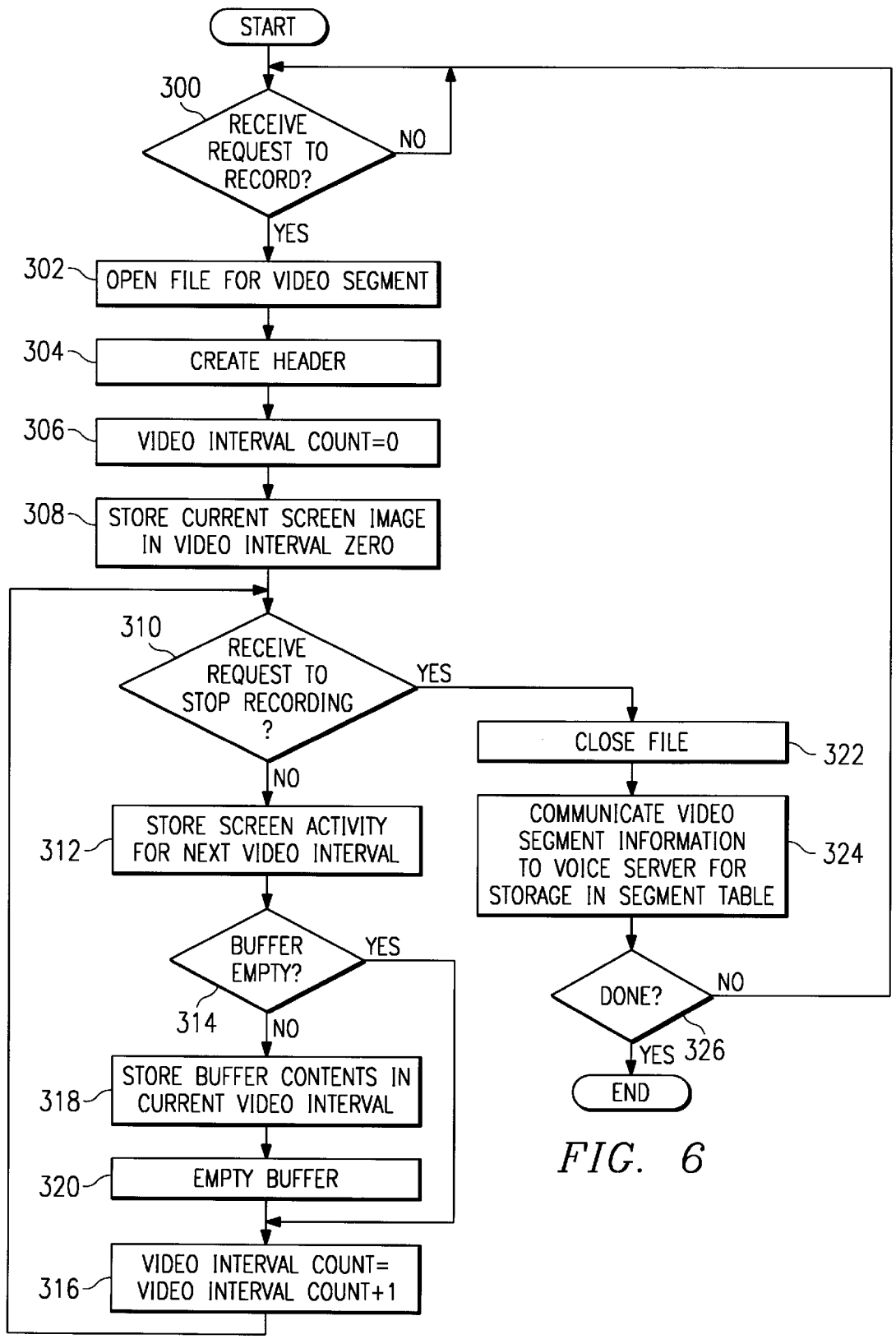
FIG. 6 is a flow chart of an exemplary method for generating a video segment in the communication system.

FIG. 6 is a flow chart of a method for generating video segment 62 in communication system 10. The method begins at step 300 where video server 42 receives a request to record video segment 62. In a particular embodiment, voice server 18 schedules and initiates the monitoring of sessions in call center 12, and sends a request to record to video server 42 using LAN 30. U.S. Pat. No. 5,535,256 discloses various techniques used by voice server 18 to schedule and record voice and video sessions in call center 12.

Upon receiving the request to record, video server 42 opens a file for video segment 62 at step 302. Video server 42 then creates header 100, which may include segment ID 104, session ID 106, and timestamp 108 at step 304. The method then sets a video interval count to zero at step 306 and stores the current screen image in video interval zero at step 308. Video data 122 stored in video interval zero may be bit-mapped information, screen display and/or draw commands, or other form of display information. As described above, bit-mapped storage of video interval zero may eliminate undesirable flicker caused by a redraw command to capture screen display and/or draw commands.

If video server 42 has not received a request to stop recording at step 310, then video server 42 stores screen activity for the next video interval 120 at step 312. For example, if the length of video interval 120 is 0.1 seconds, then step 312 stores screen changes, mouse movements, text entry, and other display activity for 0.1 seconds. Communication system may store or buffer video activity locally at computer 32 or at video server 42 in any appropriate format and using any suitable memory location or buffer. If the video activity memory or buffer is empty after the duration of one video interval 120 at step 314, then video server 42 increments the video interval count at step 316 and repeats steps 310 and 312 for the next video interval 120. If the video buffer is not empty at step 314, then video server 42 stores the buffer contents in the current video interval 120 as indicated by video interval count at step 318. Video server 42 then empties the buffer at step 320, increments the video interval at step 316, and returns to step 310 to record the next video interval 120.

If video server 42 receives a request to stop recording at step 310 during the recording of video intervals 120, then the method proceeds to close the file at step 322. Video server 42 then communicates video segment information (session ID, type, offset, length, path) to voice server 18 for storage in segment table 56 at step 324. If the method is not done at step 326, video server 42 waits to receive another request to record at step 300.

Figure 7:
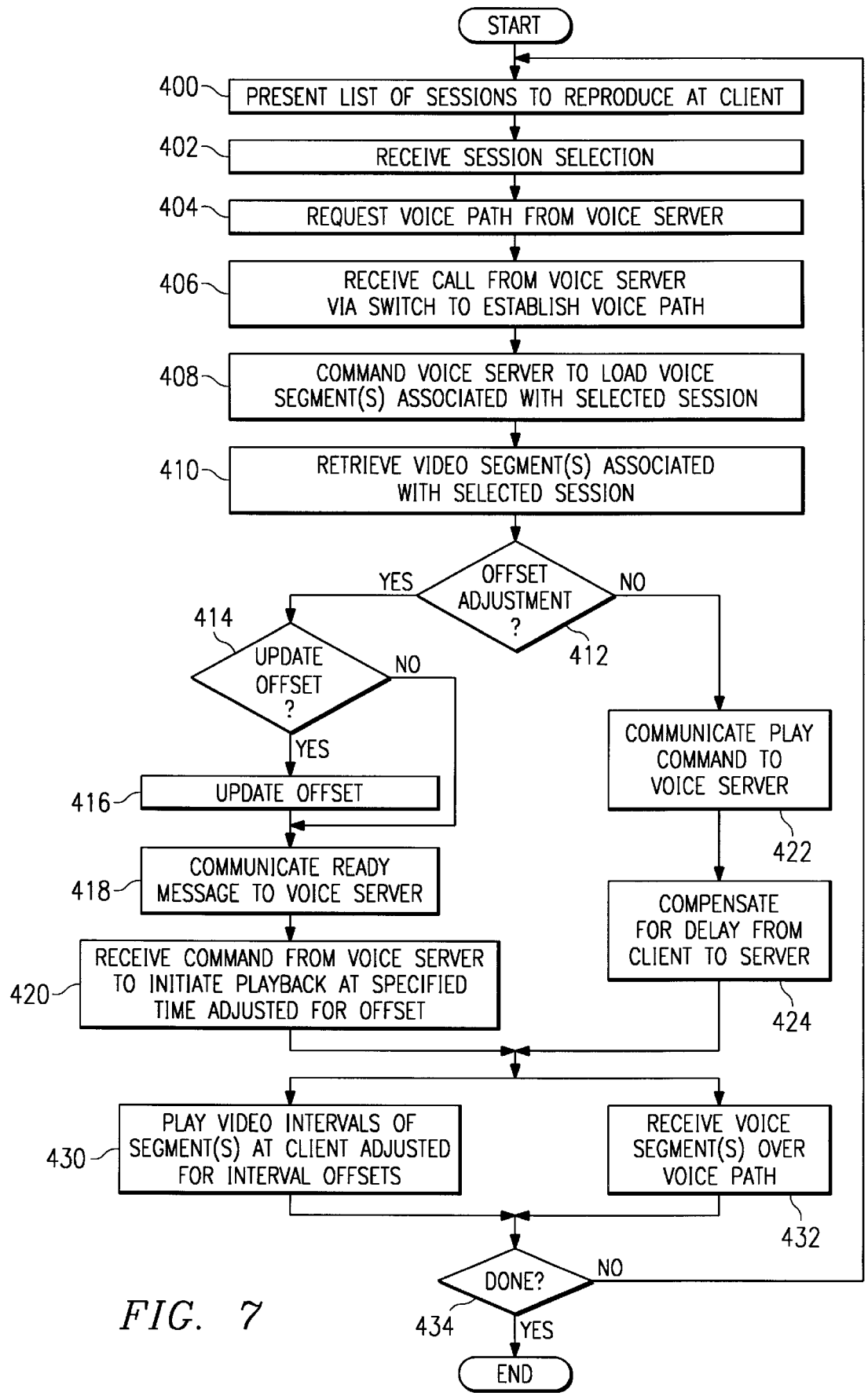
FIG. 7 is a flow chart of an exemplary method for reproducing a session having a voice segment and a video segment in accordance with the present invention.

FIG. 7 is a method for reproducing a session having a voice segment 52 and a video segment 62 in accordance with the present invention. The method begins at step 400 where a client (e.g., agent workstation 24, supervisor workstation 28) presents a list of sessions to reproduce at the client. The client receives a session selection indicated by its user at step 402. The client then requests a voice path from voice server 18 at step 404 and, in response, the client receives a call from voice server 18 via switch 16 to establish the desired voice path at step 406. In this example, call center 12 establishes a voice path using a conference bridge or other similar technique supported by switch 16. The client then commands voice server 18 to load one or more voice segments 52 stored in database 50 and associated with the selected session at step 408. The client also retrieves one or more video segments 62 stored in database 60 and associated with the selected session at step 410.

Communication system 10 can reproduce a session with or without an offset adjustment as determined at step 412. Using an offset adjustment, the method proceeds to step 414 to determine whether to update offset 154 at step 414. The decision to update offset 154 may be based on the difference between last update 156 stored in offset table 54 and the current time, the setting of an automatic update flag each time a session is reproduced at the client, or some other criteria. If appropriate, the method updates offset 154 at step 416 in accordance with the teachings of FIG. 5 and its related description.

The client communicates a ready message to voice server 18 at step 418. The client then receives a command from voice server 18 to initiate playback of one or more video segments 62 at a specified time adjusted for offset 154 at step 420. This technique allows voice server 18 to coordinate the play of voice segment 52 at voice server 18 and video segment 62 at the client, while taking into account clock differences reflected in offset table 54. The propagation delay along the voice path from voice server 18 to voice instruments 22 and 26 via switch 16 may be small in comparison to the potential delays encountered on LAN 30. Therefore, an important technical advantage of the present invention is the ability of computers 32 to retrieve and play video segment 62 locally while nearly instantaneously receiving voice segment 52 from voice server 18.

Without offset adjustment as determined at step 412, the client communicates a play command to voice server 18 at step 422. In this embodiment, there may be no need to maintain or adjust for offset 154, but significant propagation delays on LAN 30 may degrade the reproduction of the session. This may be due to the propagation delay of the play command from the client to the voice server 18, which is often hard to measure or predict. Assuming this delay is negligible, for example less than 0.1 seconds, then communication system 10 may faithfully reproduce the voice and video session without adjusting for offset 154. Alternatively, the client may anticipate the delay for voice server 18 to receive and react to the play command at step 424. In this manner, the client may improve reproduction of the session by compensating for anticipated delays. The client may compute anticipated delays based on predetermined measures or in response to current or historical performance of LAN 30.

With or without offset adjustment, the method proceeds to concurrently play video intervals 120 of video segment 62 adjusted for their associated interval offsets 124 at step 430. At the same time, the client receives voice segment 52 over the voice path at step 432. If the method is not done at step 434, then the client returns to step 400 to present a list of sessions to reproduce.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A system for reproducing a session having a voice segment and a video segment, comprising:

a voice server that stores the voice segment associated with the session;

a video server that stores the video segment associated with the session, the video segment having a plurality of video intervals, each video interval comprising video data and an associated interval offset; and a client having an associated voice instrument that communicates the voice segment, and a display that displays the video data for each video interval adjusted in time by the associated interval offset and by a client offset to reproduce the session, wherein the client offset indicates a difference between a first clock at the voice server and a second clock at the client.

2. The system of claim 1, wherein each video interval represents video activity for a fixed interval of time.

3. The system of claim 1, wherein each video interval represents video activity for a fixed interval of time, the video segment further comprises adjacent video intervals spaced apart by more than the fixed interval of time.

4. The system of claim 1, wherein the video data comprises screen draw commands.

5. The system of claim 1, wherein the voice server directs the client to begin displaying the video segment at a start time adjusted by the client offset.

6. The system of claim 1, wherein the voice server communicates the voice segment to the associated voice instrument using a voice path.

7. The system of claim 1, further comprising a switch to establish a voice path between the voice server and the associated voice instrument of the client, wherein the voice server communicates the voice segment to the associated voice instrument using the voice path.

8. A method for reproducing a session having a voice segment and a video segment, comprising:

storing the voice segment associated with the session;

storing the video segment associated with the session, the video segment having a plurality of video intervals, each video interval comprising video data and an associated interval offset;

communicating the voice segment to a voice instrument;

determining a client offset indicating a difference between a first clock at a voice server and a second clock at a client; and displaying the video data for each video interval adjusted in time by the associated interval offset and the associated client offset to reproduce the session.

9. The method of claim 8, wherein each video interval represents video activity for a fixed interval of time.

10. The method of claim 8, wherein each video interval represents video activity for a fixed interval of time, and the video segment further comprises adjacent video intervals spaced apart by more than the fixed interval of time.

11. The method of claim 8, wherein the video data comprises screen draw commands.

12. The method of claim 8, wherein the step of communicating the voice segment comprises:

establishing a voice path between a voice server and the voice instrument via a switch; and communicating the voice segment from the voice server to the voice instrument using the voice path.

13. A method for reproducing a voice and video session at a client, comprising:

receiving a selection of the session, the session identifying a voice segment and a video segment of the session;

terminating a voice path at a voice instrument associated with the client;

receiving, at the client, the video segment associated with the session, the video segment having a plurality of video intervals, each video interval comprising video data and an associated interval offset;

receiving the voice segment at the voice instrument using the voice path; and displaying, on a display at the client, the video data for each video interval adjusted in time by the associated interval offset and by an associated client offset to reproduce the session, wherein the client offset indicates a difference between a first clock at the client and a second clock at a voice server that communicates the voice segment to the voice instrument using the voice path.

14. The method of claim 13, wherein each video interval represents video activity for a fixed interval of time.

15. The method of claim 13, wherein each video interval represents video activity for a fixed interval of time, and the video segment further comprises adjacent video intervals spaced apart by more than the fixed interval of time.

16. The method of claim 13, wherein the video data comprises screen draw commands.

17. The method of claim 13, wherein the step of terminating a voice path at the voice instrument comprises placing a call from a voice server to the voice instrument via a switch.

18. A system for reproducing a session having a voice segment and a video segment, comprising:

a voice server that stores the voice segment associated with the session;

a video server that stores the video segment associated with the session; and a client having an associated voice instrument that communicates the voice segment, and a display that displays the video segment adjusted in time by a video segment offset to reproduce the session, the video segment offset indicating a difference in time between the beginning of the session and the beginning of the video segment.

19. The system of claim 18, wherein the voice instrument further communicates the voice segment adjusted in time by a voice segment offset indicating a difference in time between the beginning of the session and the beginning of the voice segment.

20. The system of claim 18, further comprising a memory that stores a segment table, the segment table having a plurality of entries, wherein each entry comprises a session identifier, a segment, and a segment offset indicating a difference in time between the beginning of the session and the beginning of the segment.

21. The system of claim 20, wherein the segment comprises a voice segment, a video segment, a voice annotation segment, or a video annotation segment.

22. The system of claim 20, wherein the segment offset comprises a voice segment offset, a video segment offset, a voice annotation segment offset, or a video annotation segment offset.

23. The system of claim 18, wherein the voice server directs the client to begin displaying the video segment at a start time adjusted by the video segment offset.

24. A method for reproducing a session having a voice segment and a video segment, comprising:

storing the voice segment associated with the session;

storing the video segment associated with the session;

communicating the voice segment to a voice instrument;

displaying the video segment adjusted in time by a video segment offset, the video segment offset indicating a difference in time between the beginning of the session and the beginning of the video segment.

25. The method of claim 24, wherein the step of communicating comprises communicating the voice segment to a voice instrument adjusted in time by a voice segment offset, the voice segment offset indicating a difference in time between the beginning of the session and the beginning of the voice segment.

26. The method of claim 24, further comprising storing a segment table, the segment table having a plurality of session identifiers, wherein each session identifier associates one of a plurality of sessions with a segment and a segment offset, the segment offset indicating a difference in time between the beginning of the session and the beginning of the segment.

27. The method of claim 26, wherein the segment comprises a voice segment, a video segment, a voice annotation segment, or a video annotation segment.

28. The method of claim 26, wherein the segment offset comprises a voice segment offset, a video segment offset, a voice annotation segment offset, or a video annotation segment offset.

29. A method for reproducing a voice and video session at a client, comprising:

receiving a selection of the session, the session identifying a voice segment and a video segment of the session;

receiving, at the voice instrument, the voice segment associated with the session;

receiving, at the client, the video segment associated with the session;

communicating the voice segment at the voice instrument; and displaying, on a display at the client, the video segment adjusted in time by a video segment offset, the video segment offset indicating a difference in time between the beginning of the session and the beginning of the video segment.

30. The method of claim 29, wherein the step of communicating comprises communicating the voice segment at the voice instrument adjusted in time by a voice segment offset, the voice segment offset indicating a difference in time between the beginning of the session and the beginning of the voice segment.

* * * * *